US 6,920,547 B2
Jul. 19, 2005

(12) United States Patent
Roth et al.

(54) REGISTER ADJUSTMENT BASED ON ADJUSTMENT VALUES DETERMINED AT MULTIPLE STAGES WITHIN A PIPELINE OF A PROCESSOR

(75) Inventors: Charles P. Roth, Austin, TX (US);
Ravi P. Singh, Austin, TX (US);
Gregory A. Overkamp, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 608 days.

(21) Appl. No.: 09/742,745

(22) Filed: Dec. 20, 2000

(65) Prior Publication Data

US 2002/0078326 A1 Jun. 20, 2002

(51) Int. Cl.[7] ................................................. G06F 9/38
(52) U.S. Cl. ........................ 712/218; 712/219; 712/241
(58) Field of Search ................................ 712/235, 241, 712/218, 214

(56) References Cited

U.S. PATENT DOCUMENTS

| 5,561,776 | A | * | 10/1996 | Popescu et al. ............. 712/239 |
| 5,592,636 | A | * | 1/1997 | Popescu et al. ............. 712/239 |
| 5,638,526 | A | * | 6/1997 | Nakada ....................... 712/218 |
| 5,996,063 | A | * | 11/1999 | Gaertner et al. ............. 712/215 |
| 6,003,128 | A | * | 12/1999 | Tran ........................... 712/241 |
| 6,189,088 | B1 | * | 2/2001 | Gschwind ................... 712/216 |

FOREIGN PATENT DOCUMENTS

| EP | 0 605 872 | 7/1994 |
| EP | 0 747 809 | 12/1996 |

OTHER PUBLICATIONS

Webster's Ninth New Collegiate Dictionary, 1990, Merriam–Webster Inc, p. 146.*
Computer Organization and Design—The Hardware/Software Interface, 2nd Edition, John L Hennessy and David A Patterson, Morgan Kaufmann Publishers, 1998; p. 541.*
W. Ye et al. "The Design and Use of SimplePower: A Cycle–Accurate Energy Estimation Tool" Microsystems Design Lab.
Translation of Office Action issued in Taiwan Application No. 090127145.
"Count tag/shadow" IBM Technical Disclosure Bulletin, vol. 13, No. 4B, Apr. 1, 1994, p. 121.

* cited by examiner

Primary Examiner—Eddie Chan
Assistant Examiner—Shane Gersti
(74) Attorney, Agent, or Firm—Fish & Richardson P.C.

(57) ABSTRACT

Register adjustment is performed based on adjustment values determined at multiple stages within a pipeline of a processor. In one embodiment, a programmable processor is adapted to include a speculative count register. The speculative count register may be loaded with data associated with an instruction before the instruction commits. However, if the instruction is terminated before it commits, the speculative count register may be adjusted. A set of counters may monitor the difference between the speculative count register and its architectural counterpart.

19 Claims, 9 Drawing Sheets

_US 6,920,547 B2_

REGISTER ADJUSTMENT BASED ON ADJUSTMENT VALUES DETERMINED AT MULTIPLE STAGES WITHIN A PIPELINE OF A PROCESSOR

BACKGROUND

This invention relates to speculative registers implemented in a programmable processor.

Conventional programmable processors, such as digital signal processors include a variety of hardware designed to improve performance of the processor and increase the speed at which software instructions are executed. The additional hardware, however, typically increases the power consumption of the processor.

"Pipelining" is a technique used in conventional programmable processors in which instructions are overlapped in execution in order to increase overall processing speed. A pipelined processor typically processes instructions in a number of stages. An instruction moves from one stage to the next according to a system clock, which typically has a clock rate determined by the slowest stage in the pipeline.

While processing instructions, "hazards," sometimes prevent the next instruction in the instruction stream from executing. For example, a data hazard may arise when an instruction depends on the results of a previous instruction that has not finished processing within the pipeline. Only when an instruction has finished being processed within the pipeline are its results written to architectural registers, where the results are generally accessible to subsequent instructions in the pipeline. Data Hazards, therefore, cause the pipeline to "stall" and reduce the pipeline's performance.

One type of hardware addition that may be implemented to improve pipeline throughput and avoid stalls is a speculative register. A speculative register is a register that speculates or predicts the value that the architectural register will have when the processing of an instruction in the pipeline has finished. However, sometimes an instruction that writes to the speculative register is terminated before it writes to the architectural register. In such a case, the speculative register may require adjustment.

DESCRIPTION

Figure 1:
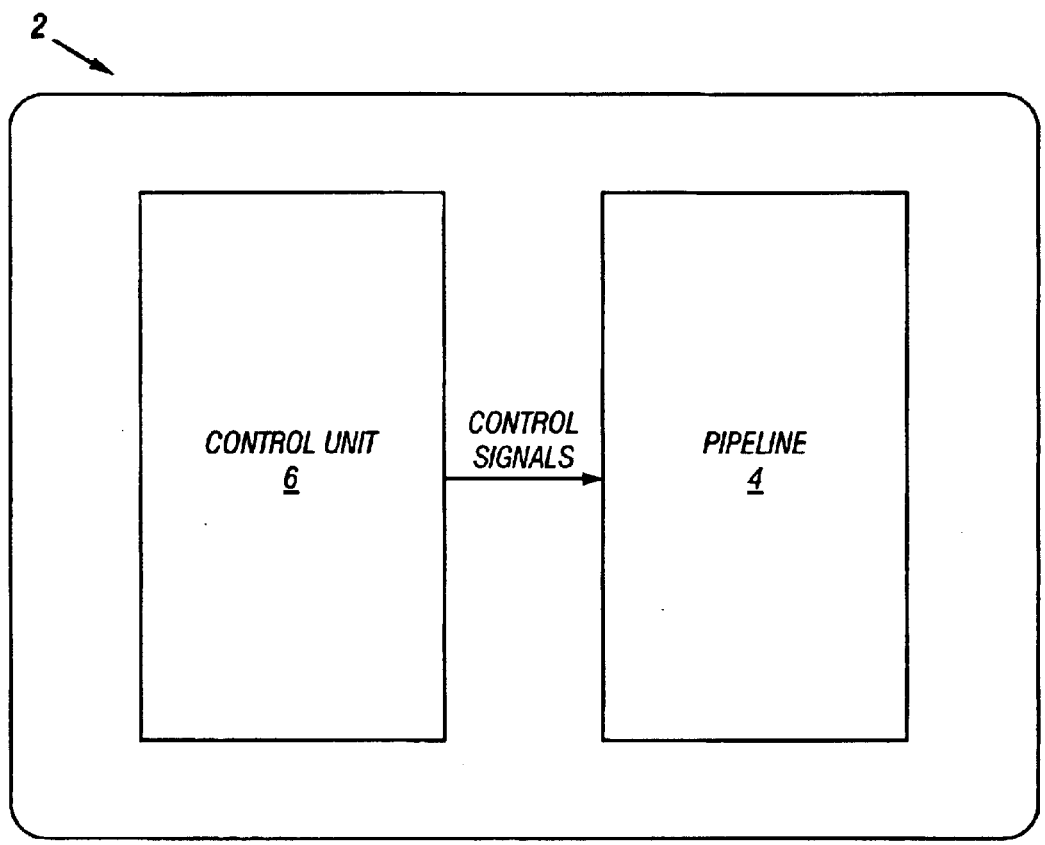
FIG. 1 is a block diagram illustrating a programmable processor according to an embodiment of the invention.

FIG. 1 is a block diagram illustrating a programmable processor 2. Processor 2 may include an execution pipeline 4 and a control unit 6. Control unit 6 may control the flow of instructions and/or data through pipeline 4 according to a system clock. For example, during the processing of an instruction, control unit 6 may direct the various components of the pipeline 4 to decode the instruction and correctly perform the corresponding operation including, for example, writing the results back to memory.

Instructions may be loaded into a first stage of pipeline 4 and processed through subsequent stages. A stage may process concurrently with the other stages. Data may pass between the stages in pipeline 4 during a cycle of the system. The results of an instruction may emerge at the end of the pipeline 4 in rapid succession.

Processor 2 may include one or more architectural registers that may store the results of one or more instructions that have finished being processed in pipeline 4. In addition, processor 2 may include one or more speculative registers that may predict the value that architectural registers may have in the future. As described in detail below, in some instances, the speculative registers may require adjustment. Therefore processor 2 may implement one or more of the techniques described herein to adjust the speculative registers.

Figure 2:
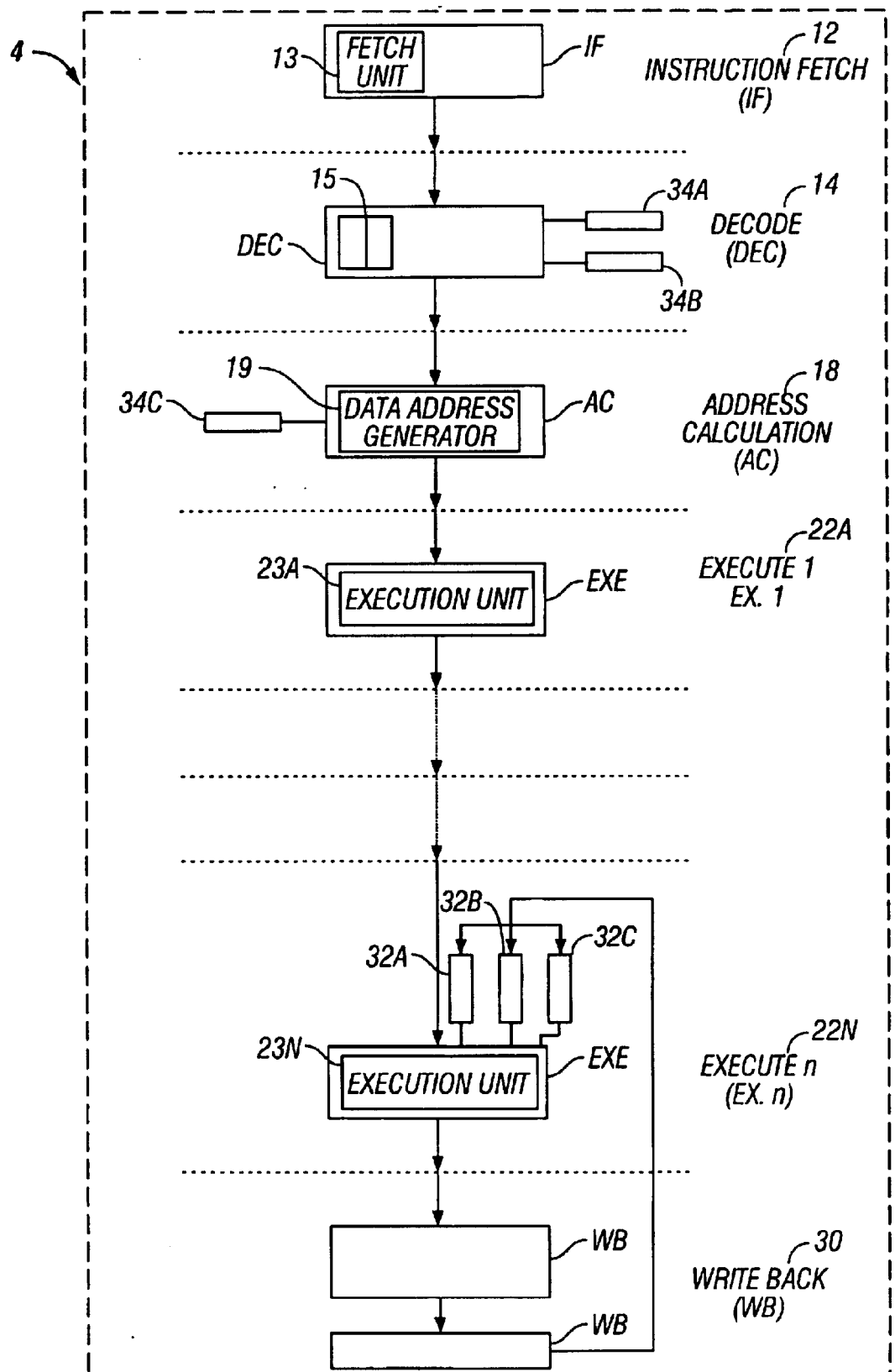
FIG. 2 is a block diagram illustrating an example pipeline according to an embodiment of the invention.

FIG. 2 is a block diagram illustrating an example pipeline. A pipeline 4 has multiple stages that may facilitate execution of multiple instructions concurrently. In pipeline 4, an instruction may enter an instruction fetch (IF) stage 12 during a first clock cycle. The instruction may then continue down the pipeline during subsequent clock cycles. Typically, additional instructions enter IF stage 12 during subsequent clock cycles respectively. The number of stages in pipeline 4 may define the number of instructions that pipeline 4 may service simultaneously.

The different stages of pipeline 4 may operate as follows. Instructions may be fetched during IF stage 12 by a fetch unit 13 and decoded from instruction registers 15 during decode (DEC) stage 14. During an address calculation (AC) stage 18, one or more data address generators 19 may calculate any memory addresses used to perform the operation.

During the execution stages 22A–22N, execution units 23 may perform specified operations such as, for example, adding or multiplying two numbers. Execution units 23 may contain specialized hardware for performing the operations including, for example, one or more arithmetic logic units (ALU's), floating-point units (FPU) and barrel shifters, although the scope of the present invention is not limited in this respect. A variety of data may be applied to the execution units 23 such as the addresses generated by data address generators 19, data retrieved from memory or data retrieved from data registers. During write back stage (WB) 30, results may be written to a memory location or data registers external to the pipeline 4 or to data registers in the pipeline 4 such as architectural registers 32. The stages of pipeline 4 may include one or more storage circuits, such as a flip-flop, for storing data.

Architectural registers 32 are generally loaded once an instruction has finished being processed in pipeline 4 and thus, "committed" to the system. This typically occurs, e.g., at the conclusion of WB stage 30. Therefore, architectural registers 32 are generally written several clock cycles after an instruction enters pipeline 4.

There are many scenarios, however, where it may be advantageous to access data associated with an instruction before the instruction has committed. For this reason, pipeline 4 may implement one or more speculative registers 34 used to speculate or "predict" a value for architectural registers 32. Generally, the speculative registers 34 may be written with data associated with an instruction before the instruction has committed.

Unlike the architectural registers 32, speculative registers 34 are typically not supported by an instruction set of processor 2. Therefore, program code may not be used to directly access speculative registers 34. For this reason, a programmer may not be able to move data in or out of the speculative registers 34 the same way that he or she could with architectural registers 32.

One instance, for example, where speculative registers are highly advantageous is a "hardware loop." A hardware loop is dedicated hardware used to handle software instructions within a loop construct. A loop setup instruction, for instance, may initialize the hardware. Then, loop instructions may be cached into local registers or buffers and issued from those local registers for iterations of the loop. In this manner, instructions cached in the hardware loop, may not need to be fetched from memory a plurality of times.

Speculative registers 34 are highly advantageous in a hardware loop context because they may allow processor 2 to more quickly detect and initialize the hardware loop. As noted above, the data in a loop setup instruction is not written to architectural registers 32 until the instruction has committed. Thus, if architectural registers 32 are used to initialize a hardware loop, the first instruction of a hardware loop may not be able to enter pipeline 4 until the loop setup instruction has committed. For example, if the first instruction in the loop enters pipeline 4 before the loop setup instruction has committed, the architectural registers 32 may not be set up to identify the instruction as part of a loop. Moreover, this problem may increase as the depth of pipeline 4 increases.

For these reasons, a loop setup instruction may be used to write the loop conditions of a hardware loop, e.g., top, bottom, and count values of the loop, to speculative registers 34. Speculative registers 34, may then be used to setup a hardware loop before the loop setup instruction has committed. For this reason, implementing one or more speculative registers 34 may increase processing speed of processor 2 by reducing or avoiding loop set up penalties.

In the hardware loop example, the top value written in speculative register 34A, for instance, may point to the first instruction of the loop. The bottom value, written in speculative register 34B, for instance, may point to the last instruction of the loop. The count value, for instance, written in speculative register 34C, may specify a number of iterations of the loop. By initializing the hardware loop when a program counter points to the top instruction and decrementing the count value every time the program counter points to the bottom instruction (e.g., decrementing a speculative count register 34C), a hardware loop may be setup and efficiently executed by processor 2.

Another instance where speculative registers may be advantageous is for use with watch points. Watch points may be implemented to aid programmers in the debugging process of a programmable processor. Watch points may be set up to monitor or "watch" particular instructions, particular types of instructions, accesses to a specified memory location, or any other condition associated with an instruction. If, for instance, an instruction being watched is executed in the pipeline a defined number of times, the system may implement a particular exception.

Watch points may also be useful to determine when a particular set of code should be implemented. For instance, a correction algorithm, or "code patch" may need to be implemented any time a particular instruction is issued more than 10 times or a particular memory location is accessed more than 10 times. A watch point may be used to watch that particular instruction and may cause a watch count register to be decremented each time that particular instruction is executed.

Like the hardware loop setup values, watch points may need to be detected as early as possible. For this reason, speculative registers 34 may be used e.g., to count the number of "watched" instructions that have entered the system. These and other scenarios may find improved system performance by implementing speculative registers.

Figure 3:
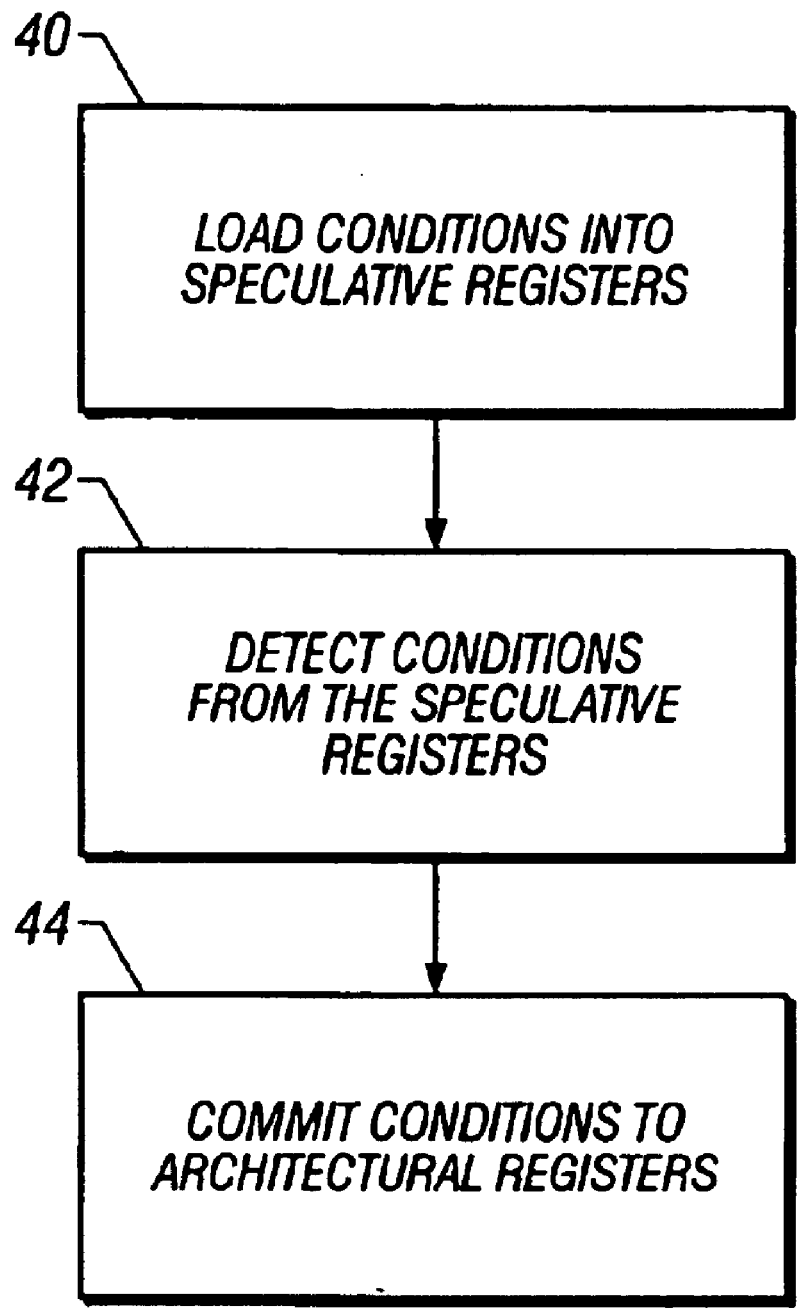
FIG. 3 is a flow diagram illustrating the timing advantages realized by the use of speculative registers according to an embodiment of the invention.

FIG. 3 is a flow diagram illustrating the timing advantages realized by the use of speculative registers. As shown in FIG. 3, one or more conditions may be loaded into one or more speculative registers (40). These conditions may then be detected (42) before the instruction that caused the conditions to be written to the speculative registers has committed (44).

Along with all the advantages, implementing speculative registers also introduces several challenges. For instance, one challenge introduced by the use of speculative registers arises because the speculative register data may need to be adjusted. If pipeline 4 must service an event (e.g., an interrupt or an exception), the pipeline's current operations may need to be terminated. If this termination occurs after a speculative register 34 has been written, but before its respective architectural counterpart 32 has been written, then the value of speculative register 34 may be inconsistent with that of the corresponding architectural register 32. In such a case, one of the speculative registers 34 may require adjustment. In other words, because speculative registers 34 are written early, a termination in pipeline 4 before the instruction has committed may require an adjustment of one of the speculative registers 34.

Figure 4:
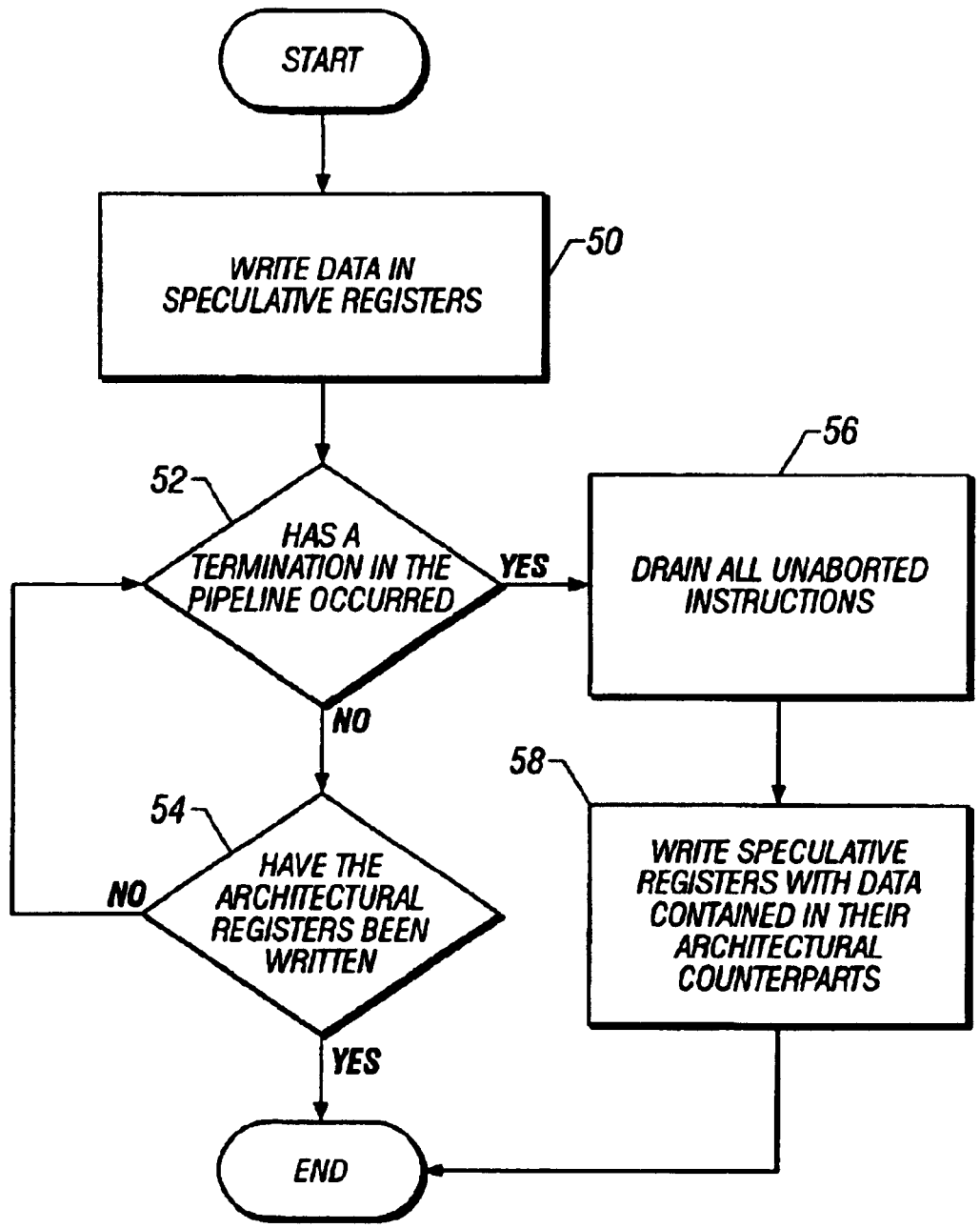
FIG. 4 is a flow diagram illustrating a mode of operation involving adjustment of speculative registers according to an embodiment of the invention.

FIG. 4 is a flow diagram illustrating a mode of operation involving adjustment of speculative registers 34. As shown in FIG. 4, the speculative registers 34 may get written (50). In one embodiment of FIG. 4, the speculative registers are specifically the speculative top 34A, speculative bottom 34B, and speculative count 34C registers implemented to handle hardware loops. If a terminate in the pipeline (52) occurs before architectural registers 32 have been written (54), then the unaborted instructions may be drained from pipeline 4 (56), and the speculative registers 34 may be adjusted by writing the data contained in their respective architectural counterparts 32 (58).

The mode of operation illustrated in FIG. 4 may be particularly useful when dealing with back-to-back hardware loops. If, for instance, a second loop is terminated before it commits, a first loop might still need to execute its remaining instructions in the pipeline. The adjustment technique in FIG. 4 provides a way to deal with this transition by adjusting speculative registers accordingly.

Adjusting a speculative count register may present particular challenges. As described above, a speculative count register may be implemented to count instructions in hardware loops, instructions with watch points, or other scenarios. However, when an instruction that affects a speculative count register is terminated before it commits, the data in speculative count register may be incorrect.

One way of correcting the speculative count register data following a termination is to allow the instructions before the termination to commit and then write the speculative count register with its architectural counterpart. However, this may add an additional penalty if the branch penalty is less than the time it takes to drain the pipeline.

Figure 5:
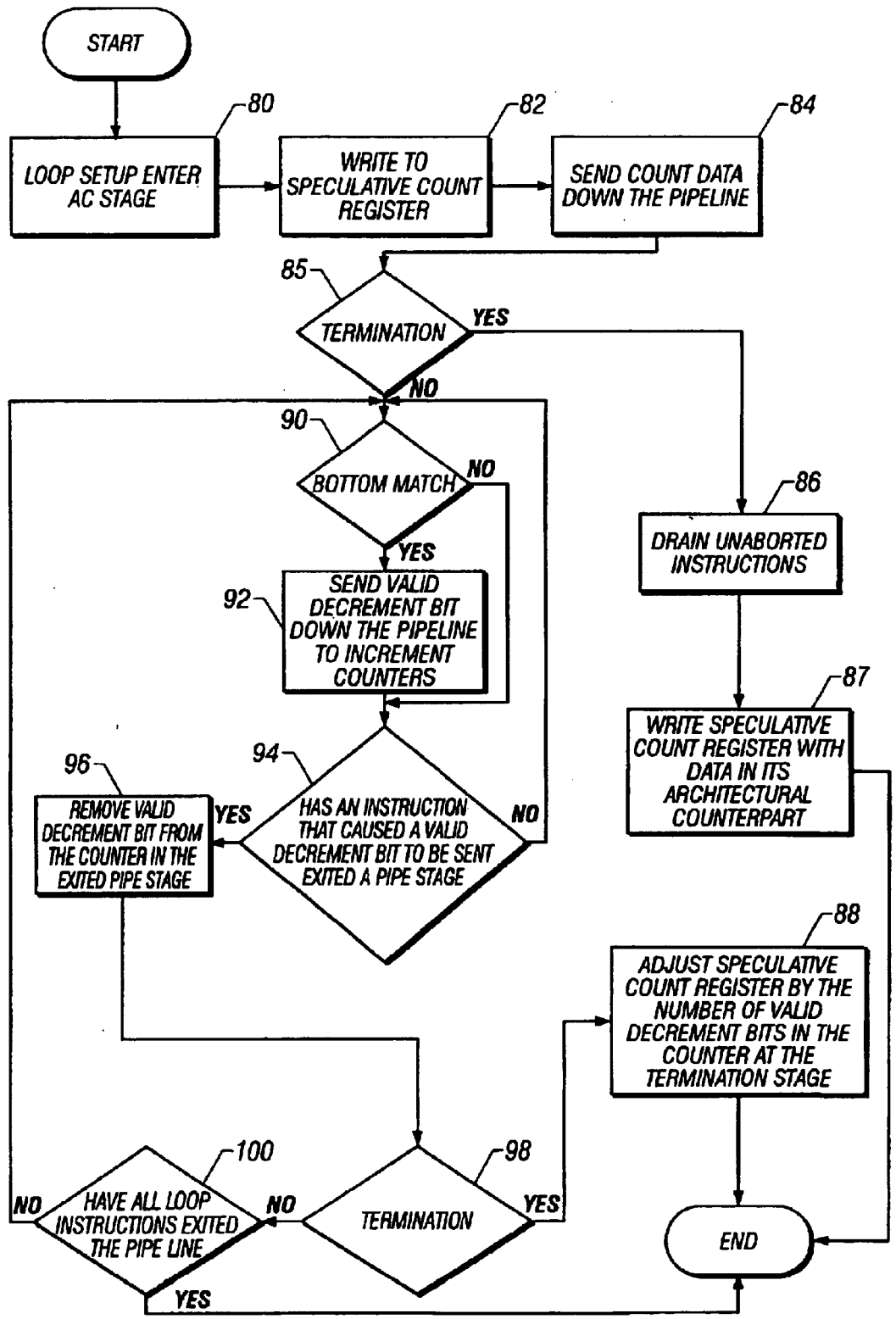
FIG. 5 is a flow diagram illustrating an efficient way of adjusting a speculative count register according to an embodiment of the invention.

FIG. 5 illustrates an efficient way of adjusting a speculative count register. FIG. 5 illustrates the adjustment in the context of a hardware loop, but the scope of the invention is not limited in that respect. As shown, after a loop setup instruction enters AC stage (80), the speculative count register may be written (82). At this point, the count data may be sent down the pipeline (84). If a termination (85) occurs, unaborted instructions may be drained (86) and the speculative count register may be written with the data in its architectural counterpart (87).

At a bottom match (90), e.g., when a program counter is pointing to the bottom instruction of an instruction loop, a valid decrement bit may be sent down the pipeline (92). When an instruction that caused a valid decrement bit to be sent exits each pipe stage (94), a counter at that exited pipe stage gets decremented by one (96). In other words, counters in the pipe stages may be incremented when a valid decrement bit is sent (e.g. at 92) and an individual counter may then be decremented (e.g. at 96) when the instruction that caused the valid decrement bit to be sent exits the pipe stage. The respective counter at each stage represents the number of valid decrements that reside in the pipeline between that stage and stage where the speculative count register resides. Thus, any time a termination occurs at a stage, that stage's counter may be used to adjust the speculative count register.

If a termination occurs in the pipeline (98), the speculative count register may be adjusted (88) by the number of valid decrement bits counted by the counter at the termination stage. The steps in FIG. 5 may repeat themselves until all loop instructions have exited the pipeline (100).

The speculative count register may be decremented at every bottom match (e.g., accounting for every pass through a hardware loop). However, rather than propagate the whole count value down the pipeline after every bottom match, only a single valid decrement bit may be sent down the pipeline. In this manner, a hardware reduction may be realized in processor 2. The set of counters may monitor valid decrement bits and the associated instructions that caused those bits to be sent. As such, the set of counters may keep a running tab on differences between a speculative count register and its architectural counterpart.

Figure 6:
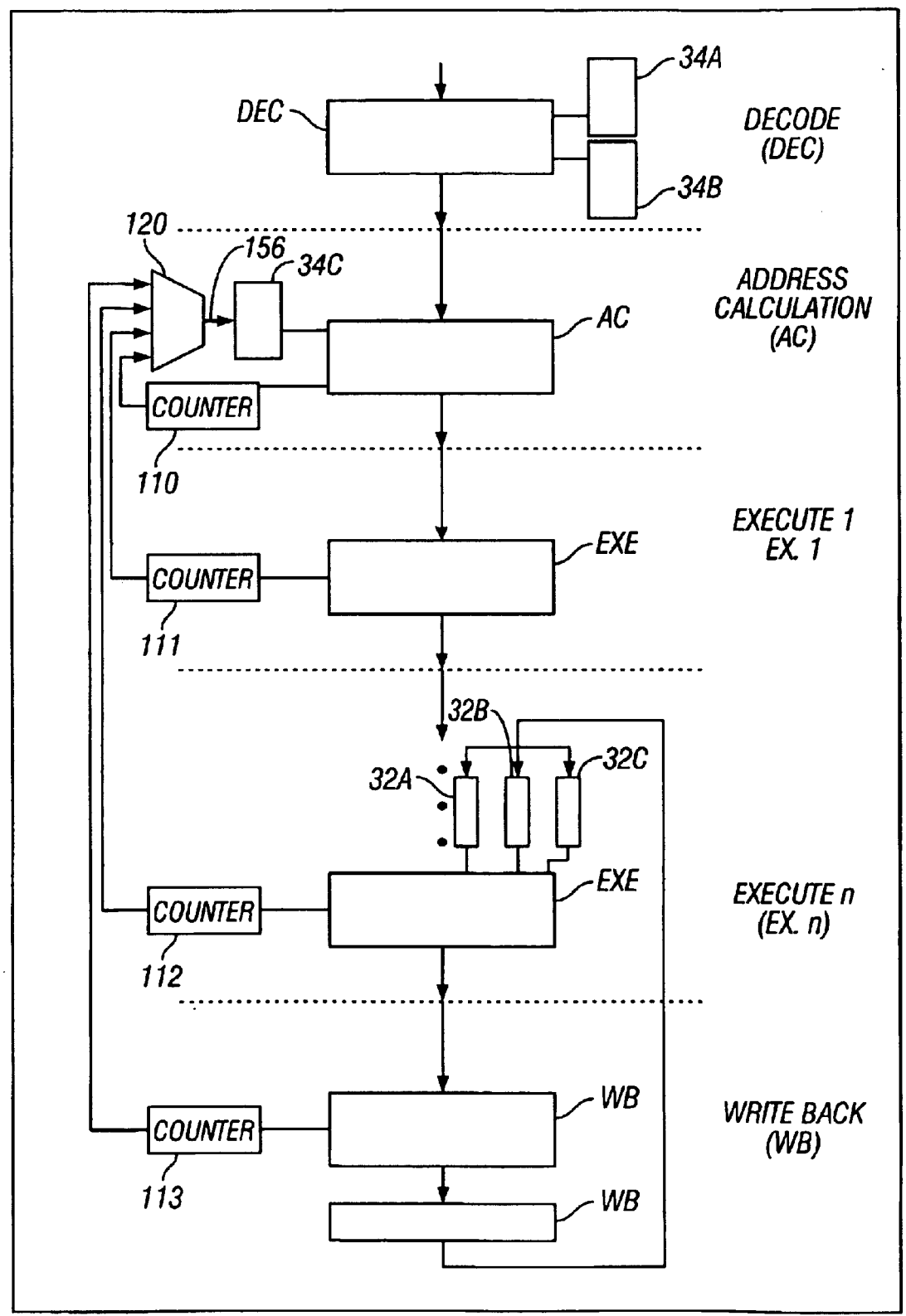
FIG. 6 is a block diagram illustrating counters in a circuit according to an embodiment of the invention.

FIG. 6 is a block diagram illustrating counters in a pipeline. As shown, counters may be maintained at every stage of the pipeline after DEC (110, 111, 112 and 113). Therefore, a single valid decrement bit may be propagated down the pipeline to account for the difference between the speculative count register and its architectural counterpart. The counter may be connected to the input of a multiplexer 120. Multiplexer 120 may determine which counter, if any, is used to adjust the speculative count register 34C. If necessary, multiplexer 120 may output an adjustment signal 156 to make the appropriate adjustment.

In other embodiments, a termination may not occur at certain stages, or may be restricted when a certain instruction resides in a certain stage. In such embodiments, a hardware reduction may be realized by not implementing counters in the stages where a termination is restricted.

The width of counters 110, 111, 112 and 113 may be altered as needed. For instance, counter 110 may be a one-bit counter and 111 may be a two-bit counter. The minimal depth of counters 112 and 113 may depend on the number of stages in the pipeline. Counter 110 may be a one-bit counter because it always has a value of either 1 or zero. For instance, it has a value of one if a bottom match instruction is currently in AC. When the instruction leaves AC, the counter returns to zero.

Counter 111 and the next counter (e.g. for stage EX 2) may be two-bit counters, although the scope of the present invention is not limited in this respect. This is because counter 111 (e.g. the EX 1 counter) may have a maximum value of two, the EX 2 counter may have a maximum value of three. The EX 3 counter has a maximum value of four, hence, it may need three bits. Similarly, the next three counters (e.g. EX 4 to EX 6) may be three-bit counters capable of representing between five to seven values respectively.

The counter width for each stage may be determined by considering the maximum value that the counter may need to hold. In the hardware loop example, this may correspond to the case where the loop is a single instruction loop. Thus, the depth of the counters may simply correspond to the number of stages between the counter and AC. Again, however, the size may also depend on whether a termination may occur in a particular stage; so some stages may not need counters.

Another mode of operation is a hybrid way of adjusting the speculative count register. The counters residing at the selected stages of the pipeline may be used to adjust the speculative count register if the penalty associated with draining the pipeline is greater than the branch penalty. However, if the drain penalty is less than or equal to the branch penalty, then the instructions in the pipeline may be allowed to commit so that the speculative count register may be adjusted from its architectural counterpart. System operation may be chosen depending on where in the pipeline the termination occurred. In one case, a pipeline having 3 execute stages may be drained if the termination occurs in EX 3 stage or WB stage; but the pipeline may not be drained and the speculative count register may be adjusted if the termination occurs before the EX 3 stage.

Figure 7:
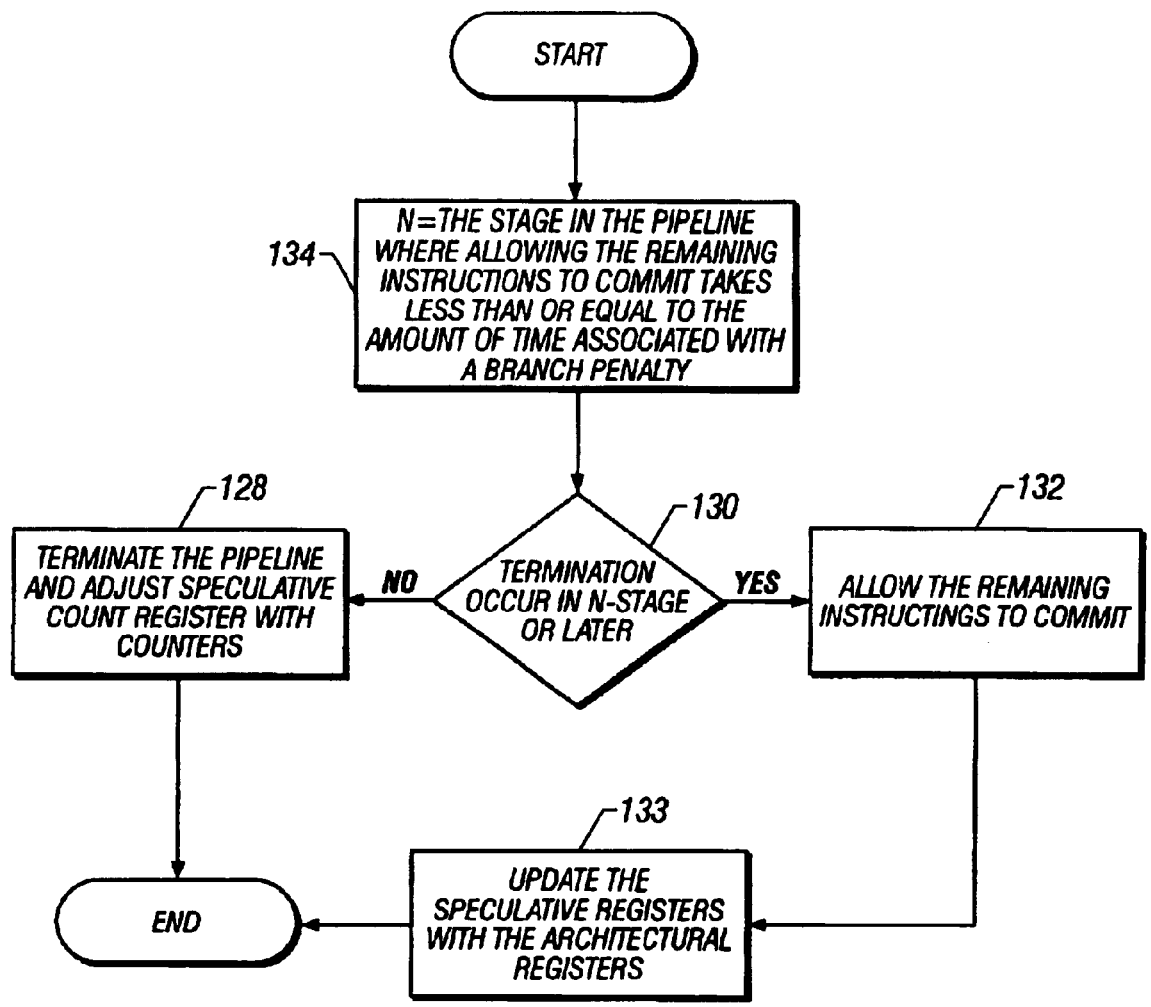
FIG. 7 is a flow diagram illustrating a hybrid mode of operation according to an embodiment of the invention.

FIG. 7 is a flow diagram illustrating a hybrid mode of operation. As shown, a counter may adjust a speculative count value (128) if a termination (130) occurs before the $n^{th}$ stage of the pipeline. However, if termination (130) occurs after the $n^{th}$ stage then the instructions in the pipeline may be allowed to flow through the pipeline and commit (132). The speculative registers may then be updated with the data in their architectural counterparts (133). The variable n may define the point at which allowing instructions to flow through the pipeline takes an amount of time less than or equal to the branch penalty (134).

Figure 8:
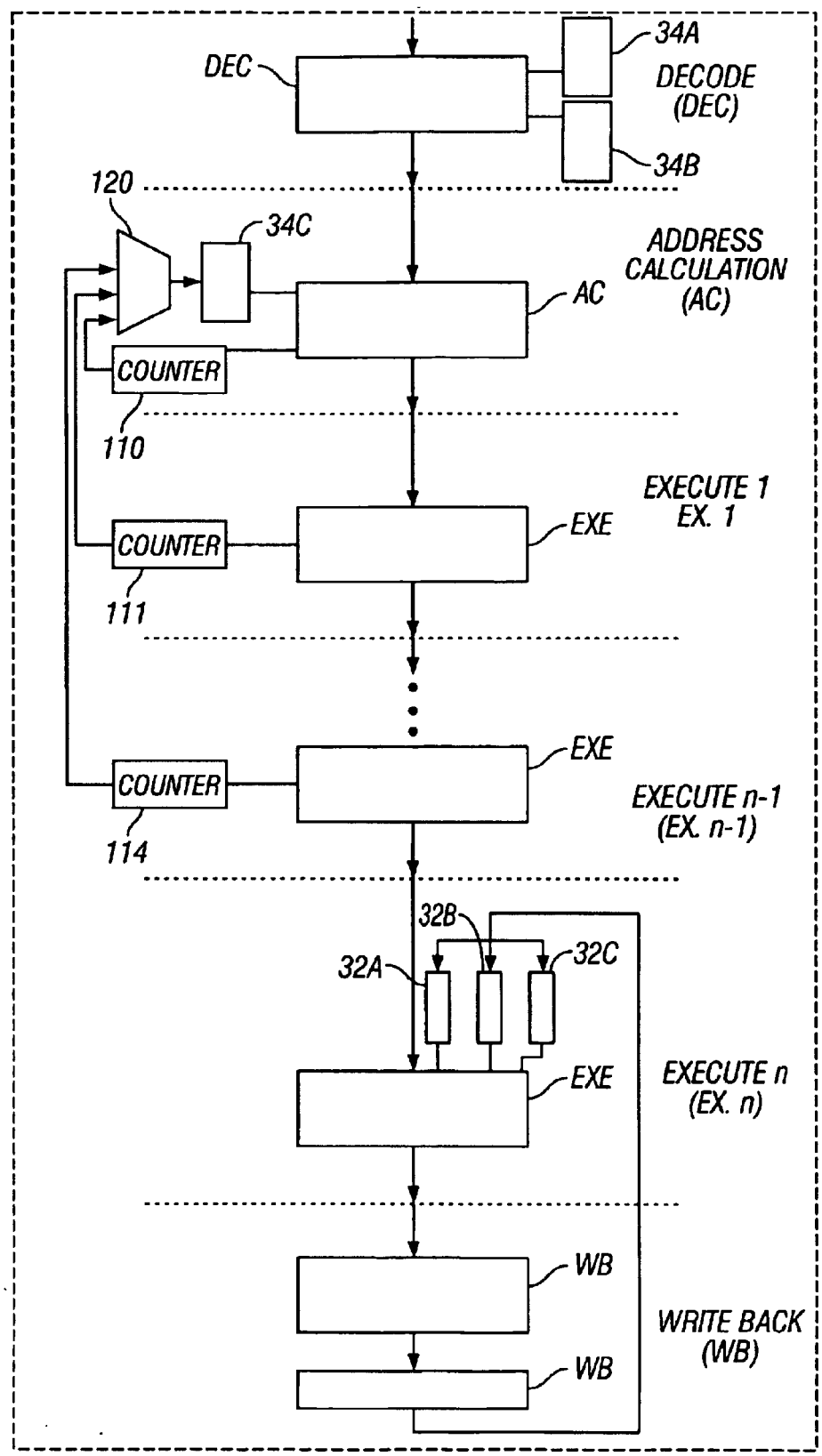
FIG. 8 is a block diagram illustrating a hybrid circuit according to an embodiment of the invention.

FIG. 8 illustrates a hybrid circuit having counters 110, 111, 114 in an AC stage and the first n−1 execution stages. The circuit may allow the pipeline to execute its instructions following a termination if the termination occurs in an $n^{th}$ execution stage or later. However, the circuit may adjust a speculative count register following a termination if the termination occurs in the $(n-1)^{th}$ execution stage or earlier. Again, the variable n may define the point at which allowing instructions to flow through the pipeline takes an amount of time less than or equal to the branch penalty. In other cases, the variable n may reside much earlier in the pipeline (e.g., where the branch penalty is larger). In still other cases, the variable n may be defined in terms of the number of stages rather than the number of execution stages.

Figure 9:
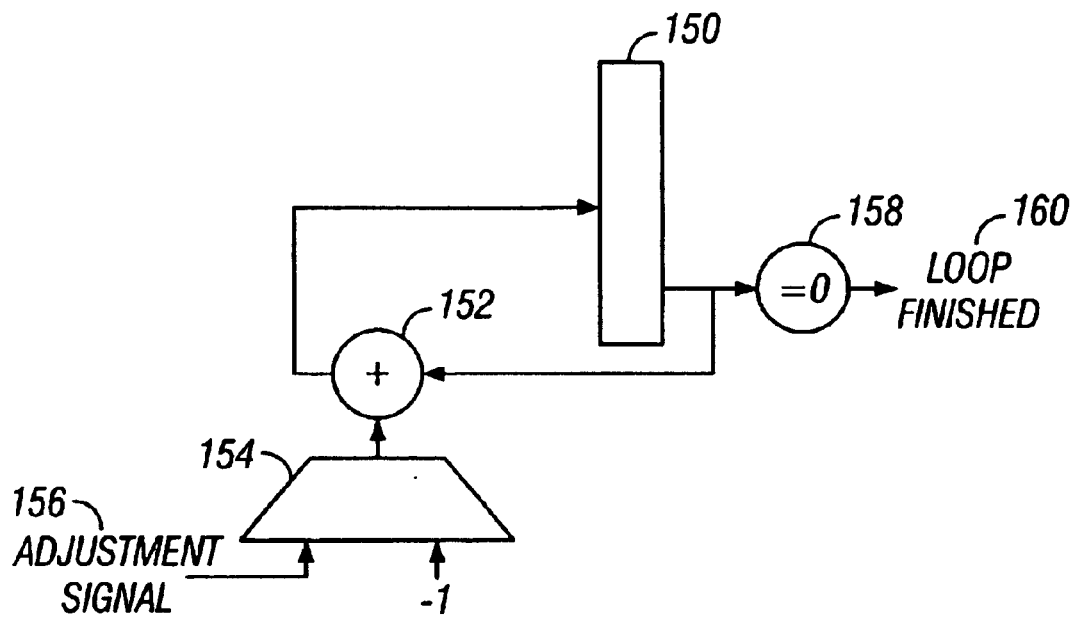
FIG. 9 illustrates an exemplary circuit for incrementing a speculative register in a hardware loop scenario according to an embodiment of the invention.

FIG. 9 illustrates an exemplary circuit for incrementing a speculative count register 150 in a hardware loop scenario.

On each pass of loop, multiplexer 154 may decrement the speculative count register 150 using an adder 152. However, if adjustment is necessary (e.g. if a loop instruction is terminated before it commits), the adjustments signal 156 may adjust the speculative count register 150 accordingly. Once the loop has finished its last iteration, comparator 158 may send a signal 160 so indicating.

Figure 10:
FIG. 10 illustrates an example system.

Various embodiments of the invention have been described. For example, various techniques for adjusting a speculative register have been described for implementation within a processor. The processor may be implemented in a variety of systems including general purpose computing systems, digital processing systems, laptop computers, personal digital assistants (PDA's) and cellular phones. FIG. 10 illustrates an example system. In such a system, the processor 2 may be coupled to a memory device 8, such as a FLASH memory device or a static random access memory (SRAM) that stores an operating system and other software applications. These and other embodiments are within the scope of the following claims.

What is claimed is:

1. A method comprising:

detecting a condition in a processor;

calculating multiple adjustment values for a single register, said calculating of multiple adjustment values occurring concurrently at multiple respective hardware stages within a pipeline of the processor; and updating the single register with one of the adjustment values when an instruction associated with the condition is terminated within the pipeline.

2. The method of claim 1, wherein calculating the adjustment values comprises:

incrementing the adjustment values when the condition is detected; and decrementing the adjustment values when the instruction leaves the stages.

3. The method of claim 1, wherein detecting a condition comprises detecting an access to a specified memory location.

4. The method of claim 1, wherein detecting the condition comprises detecting an instruction within a hardware loop.

5. The method of claim 4, wherein detecting the instruction within the hardware loop comprises detecting a bottom match.

6. The method of claim 1, wherein detecting a condition comprises detecting a watch point.

7. The method of claim 1, wherein updating the register with one of the adjustment values comprises adjusting the register by an amount determined by a counter residing in the stage where the termination occurred.

8. The method of claim 1, wherein updating the register comprises updating a speculative register.

9. A apparatus comprising:

a first register;

a second register; and a set of multiple counters to monitor a difference between the first register and the second register, wherein the first register, second register and set of counters reside in a multi-stage pipeline controlled by a control unit, and the set of counter include a first counter maintained at a hardware stage where the first register resides and additional counters maintained at hardware stages after the hardware stage where the first register resides.

10. The apparatus as in claim 9, wherein the set of counters consist of counters residing at stages before an $n^{th}$ stage of a pipeline, and wherein n defines a point at which allowing instructions to flow through the pipeline takes an amount of time less than or equal to a branch penalty.

11. The apparatus as in claim 9, wherein following a termination of an instruction in the pipeline, the control unit is adapted to adjust the first register by an amount determined by a particular counter maintained in a stage where the termination occurred.

12. The apparatus as in claim 9, wherein the control unit is adapted to:

increment the counters when the first register is adjusted because of a detected condition; and decrement a respective counter when the instruction associated with the condition leaves a respective stage associated with the respective counter.

13. An apparatus comprising:

a speculative register;

an architectural register; and a set of multiple counters to monitor a difference between the speculative register and the architectural register, wherein the speculative register, architectural register and set of counters reside in a multi-stage pipeline controlled by a control unit, and the set of counters include a first counter maintained at a hardware stage where the speculative register resides and additional counters maintained at hardware stages after the hardware stage where the speculative register resides.

14. The apparatus as in claim 13, wherein the speculative register is a speculative count register and the architectural register is an architectural count register.

15. A system comprising:

a static random access memory device;

a first register;

a second register;

a set of multiple counters to monitor a difference between the first register and the second register; and a processor coupled to the static random access memory device, wherein the processor includes an execution pipeline and a control unit adapted to:

increment the counters when the first register is adjusted because of a detected condition; and decrement a respective counter when the instruction associated with the condition leaves a respective hardware stage of the pipeline associated with the respective counter, each of the counters being maintained at a separate respective hardware stage.

16. The system of claim 15, wherein following a termination of the pipeline, the control unit is adapted to adjust the first register.

17. The system of claim 16, wherein the control unit is adapted to adjust the first register by an amount determined by one of the set of counters.

18. The system of claim 17, wherein the one of the set of counters is a particular counter residing in a stage of the pipeline where the termination occurred.

19. The system of claim 16, wherein the control unit is adapted to drain unaborted instructions and write the first register with the data in the second register, if the termination occurs in a stage of the pipeline after an $n^{th}$ stage.

* * * * *